United States Patent
Kurata (10) Patent No.: US 10,220,901 B2
(45) Date of Patent: Mar. 5, 2019

(54) POSITION LIGHTING DEVICE AND VEHICLE

(71) Applicant: SUZUKI MOTOR CORPORATION, Hamamatsu-shi, Shizuoka (JP)

(72) Inventor: Koji Kurata, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/819,718

(22) Filed: Nov. 21, 2017

(65) Prior Publication Data

US 2018/0148116 A1    May 31, 2018

(30) Foreign Application Priority Data

Nov. 30, 2016 (JP) ................. 2016-232693

(51) Int. Cl.
*B62J 6/04* (2006.01)
*B60Q 1/26* (2006.01)
*B60Q 1/30* (2006.01)

(52) U.S. Cl.
CPC .............. *B62J 6/04* (2013.01); *B60Q 1/2615* (2013.01); *B60Q 1/30* (2013.01)

(58) Field of Classification Search
CPC ......... B60Q 1/85; B60Q 1/26; B60Q 1/2696; B60Q 1/28; B60Q 1/30; B60Q 1/1423; B60Q 1/38; B60Q 11/00; B60Q 2300/10; B60Q 2300/14; B60Q 2300/45; B62J 6/02; B62J 6/04

USPC ......... 315/77, 76, 307; 307/10.1, 10.8, 157, 307/9.1; 340/458; 362/464, 487, 473
See application file for complete search history.

(56) References Cited

U.S. PATENT DOCUMENTS

| 5,072,339 A | * | 12/1991 | Shimojo | ................. | B60Q 1/24 |
| | | | | | 362/473 |
| 2014/0049973 A1 | * | 2/2014 | Adachi | ................. | B60Q 1/085 |
| | | | | | 362/465 |
| 2014/0184798 A1 | * | 7/2014 | Wedajo | ............. | G06K 9/00791 |
| | | | | | 348/148 |

FOREIGN PATENT DOCUMENTS

JP    63-213203 A    9/1988

* cited by examiner

*Primary Examiner* — Daniel D Chang
(74) *Attorney, Agent, or Firm* — Stein IP, LLC (57) ABSTRACT

A position lighting device is configured to be installed on a vehicle and configured to radiate a beam such that people outside the vehicle can recognize the vehicle. A lighting unit is configured to radiate a beam to a ceiling part or a side wall part of a tunnel-like structure which has at least a floor part, the ceiling part, and the side wall part. A position recognizing unit is configured to recognize that the vehicle is positioned in the tunnel-like structure. A radiation control unit is configured to control the lighting unit to radiate the beam if the position recognizing unit recognizes that the vehicle is positioned in the tunnel-like structure.

9 Claims, 5 Drawing Sheets

POSITION LIGHTING DEVICE AND VEHICLE

CROSS-REFERENCE TO RELATED APPLICATIONS

The disclosure of Japanese Patent Application No. 2016-232693 filed on Nov. 30, 2016, including specification, drawings and claims is incorporated herein by reference in its entirety.

TECHNICAL FIELD

The present invention relates to a position lighting device for radiating a beam, thereby making people outside a vehicle recognize the vehicle, and the vehicle including the position lighting device.

BACKGROUND

Patent Document 1 discloses a lamp for an automobile, configured to have a multi-reflector structure as the internal structure of the lamp, thereby expanding a beam irradiation range, and to radiate a beam to show a part of a vehicle, thereby making the other people recognize the width and height of the vehicle.

Patent Document 1: Japanese Patent Application Publication No. S63-213203 A

In tunnel-like structures such as tunnels and underpasses, since sunlight is blocked, it's dark. Therefore, in a case where a vehicle runs in a tunnel-like structure, as compared to a case where the vehicle runs outside the tunnel-like structure, it is more difficult for the driver to recognize preceding vehicles. As a result, there is a risk that a driver would miss a preceding vehicle and make the driver's vehicle come too close to the preceding vehicle. Especially, in a case where the preceding vehicle is a small vehicle such as a saddle-ridden type vehicle, the driver is likely to miss the preceding vehicle, and a possibility that the driver's vehicle will come too close to the preceding vehicle increases.

Also, the point of view of a driver of a large vehicle such as a large truck is likely to see a far distance since the driver's seat is at a position high from the road. Therefore, the driver is likely to miss a preceding vehicle running near the driver's vehicle, a saddle-ridden type vehicle hiding behind that preceding vehicle, and the like. As a result, there is a risk that excessive approaching the preceding vehicle, unreasonable pulling over with respect to the saddle-ridden type vehicle, or unreasonable overtaking would occur.

Meanwhile, the lamp for an automobile disclosed in Patent Document 1 has an expanded beam irradiation range, and can irradiate a part of the vehicle body with a beam from the lamp. Therefore, it can be considered that in a case where individual vehicles are equipped with such lamps, as compared to a case where the individual vehicles are not equipped with them, it is easy for the drivers of the individual vehicles to recognize preceding vehicles.

However, although the above-mentioned lamp has the expanded beam irradiation range, that is limited to the vehicle body and a range close to the vehicle body around the vehicle body. Therefore, even in the case where the individual vehicles running in a tunnel-like structure are equipped with the above-mentioned lamps, it may be difficult for the drivers to recognize preceding vehicles as will be described below.

In a case where a plurality of vehicles are running in front of a vehicle of a driver along the traveling direction of the driver's vehicle, a preceding vehicle far from the driver's vehicle may hide behind another preceding vehicle close to the driver's vehicle. At the same time as this, a beam from the lamp mounted on the preceding vehicle far from the driver's vehicle may be blocked by the preceding vehicle close to the driver's vehicle. In this case, it is difficult for the driver to recognize the preceding vehicle far from the driver's vehicle. Especially, in a case where the preceding vehicle far from the driver's vehicle is a saddle-ridden type vehicle, this situation is likely to occur.

SUMMARY

It is therefore an object of at least one aspect of the present invention to provide a position lighting device and a vehicle capable of making people outside the vehicle in a tunnel-like structure easily recognize the vehicle and capable of improving preventive safety.

According to an aspect of the embodiments of the present invention, there is provided a position lighting device configured to be installed on a vehicle and configured to radiate a beam such that people outside the vehicle can recognize the vehicle, and the position lighting device including a lighting unit configured to radiate a beam to a ceiling part or a side wall part of a tunnel-like structure which has at least a floor part, the ceiling part, and the side wall part, a position recognizing unit configured to recognize that the vehicle is positioned in the tunnel-like structure, and a radiation control unit configured to control the lighting unit to radiate the beam if the position recognizing unit recognizes that the vehicle is positioned in the tunnel-like structure.

According to another aspect of the embodiments of the present invention, there is provided a vehicle including the above-described position lighting device.

According to the above aspects, it is possible to make people outside the vehicle in the tunnel-like structure easily recognize the corresponding vehicle, and it is possible to improve preventive safety.

DETAILED DESCRIPTION OF THE EMBODIMENTS

A position lighting device of embodiments of the present invention is a device for radiating a beam, thereby making people outside a vehicle recognize the vehicle. The position lighting device includes a lighting unit, a position recognizing unit, and a radiation control unit.

The lighting unit can radiate a beam to a ceiling part or a side wall part of a tunnel-like structure. The position recognizing unit can recognize that the vehicle is located in the tunnel-like structure. The radiation control unit can control the lighting unit to radiate the beam if the position recognizing unit recognizes that the vehicle is located in the tunnel-like structure.

The tunnel-like structure is a structure having at least a floor part, a ceiling part, and a side wall part. On a road is formed on the floor part such that vehicles can pass through the tunnel-like structure. Examples of the tunnel-like structure include tunnels, underpasses, escape passages, rock sheds, snow sheds, parts underneath overpasses, and so on.

The position lighting device is mounted on a vehicle. Hereinafter, in this section, for convenience of explanation, the vehicle equipped with will be referred to as a subject vehicle. When the subject vehicle is located in the tunnel-like structure, the beam is radiated from the lighting unit to the ceiling part or the side wall part of the tunnel-like structure. People outside the subject vehicle, such as drivers of the other vehicles running behind the subject vehicle can see a reflected beam of the beam radiated to the ceiling part or the side wall part of the tunnel-like structure. Then, on the basis of the reflected beam, those people can recognize the position of the vehicle equipped with the lighting unit which is the radiation source of the reflected beam.

Like this, according to the position lighting device, a beam is radiated from the lighting unit to the ceiling part or the side wall part of the tunnel-like structure, such that people outside the subject vehicle can see a reflected beam of the radiated beam. In this way, it is possible to make those people recognize the existence or the position of the subject vehicle. Therefore, it is possible to prevent the subject vehicle from being missed, for example, by drivers of the other vehicles running behind the subject vehicle, thereby preventing the other vehicles from coming too close to the subject vehicle, and it is possible to improve preventive safety.

Also, according to recognition of the position of the subject vehicle by the position recognizing unit and control of the radiation control unit on the lighting unit, when the subject vehicle is located in the tunnel-like structure, a beam is automatically radiated from the lighting unit. Therefore, the driver of the subject vehicle does not need to manually operate the position lighting device. Therefore, it is possible to prevent load on the driver of the vehicle from increasing due to addition of the position lighting device to the vehicle.

[First Embodiment]

Figure 1:
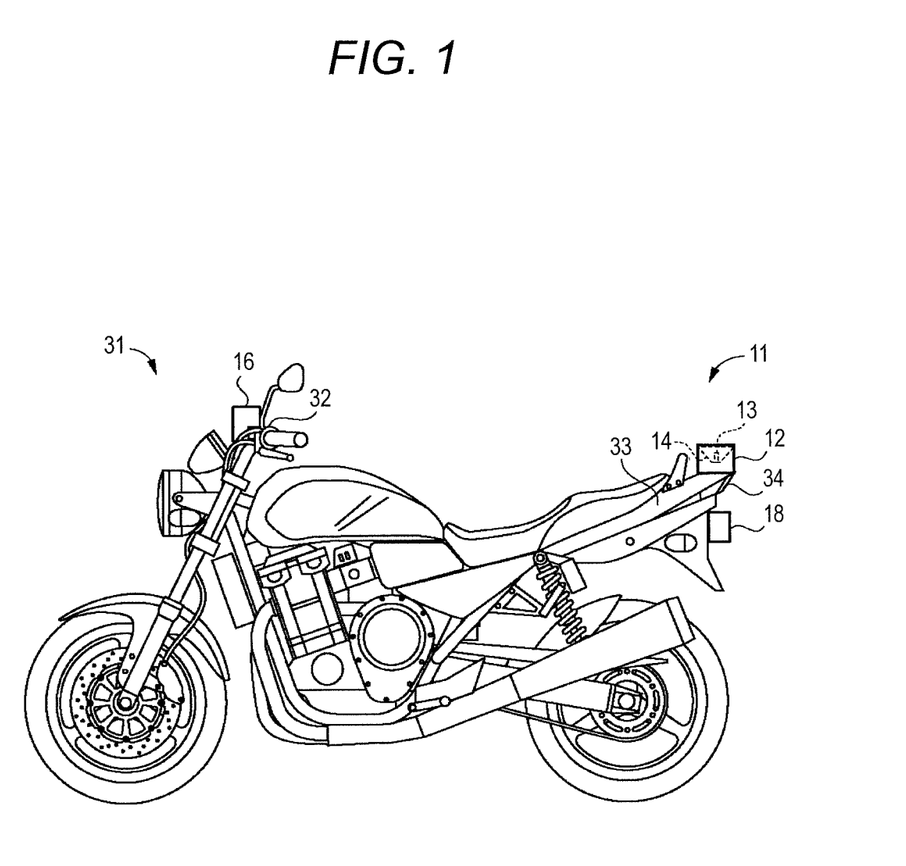
FIG. 1 is an explanatory view illustrating a motorcycle equipped with a position lighting device according to a first embodiment of the present invention.

FIG. 1 shows a motorcycle 31 equipped with a position lighting device 11 according to a first embodiment of the present invention. As shown in FIG. 1, the position lighting device 11 is a device installed on the motorcycle 31 and configured to radiate a beam in a tunnel-like structure, thereby making people outside the motorcycle 31 recognize the motorcycle 31. Hereinafter, in sections of individual embodiments, for convenience of explanation, a motorcycle equipped with a position lighting device will also be referred to as a subject vehicle.

Figure 2:
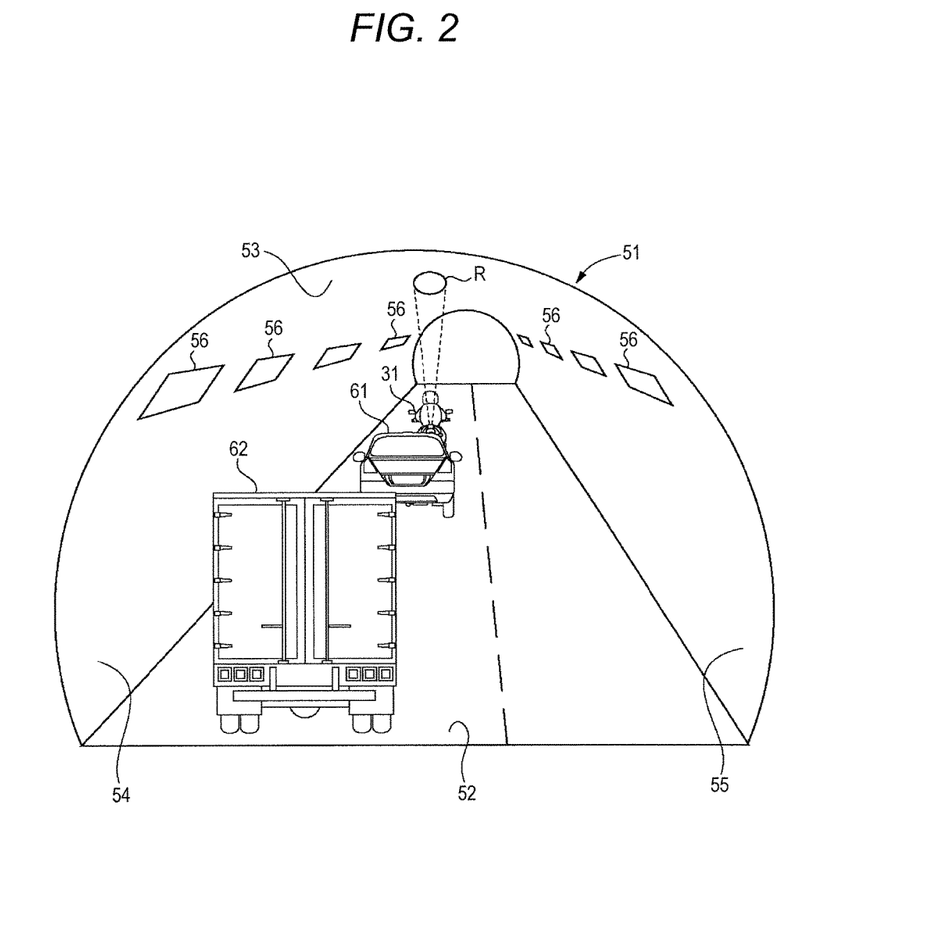
FIG. 2 is an explanatory view in which vehicles running in a tunnel-like structure are seen from behind.
Figure 3:
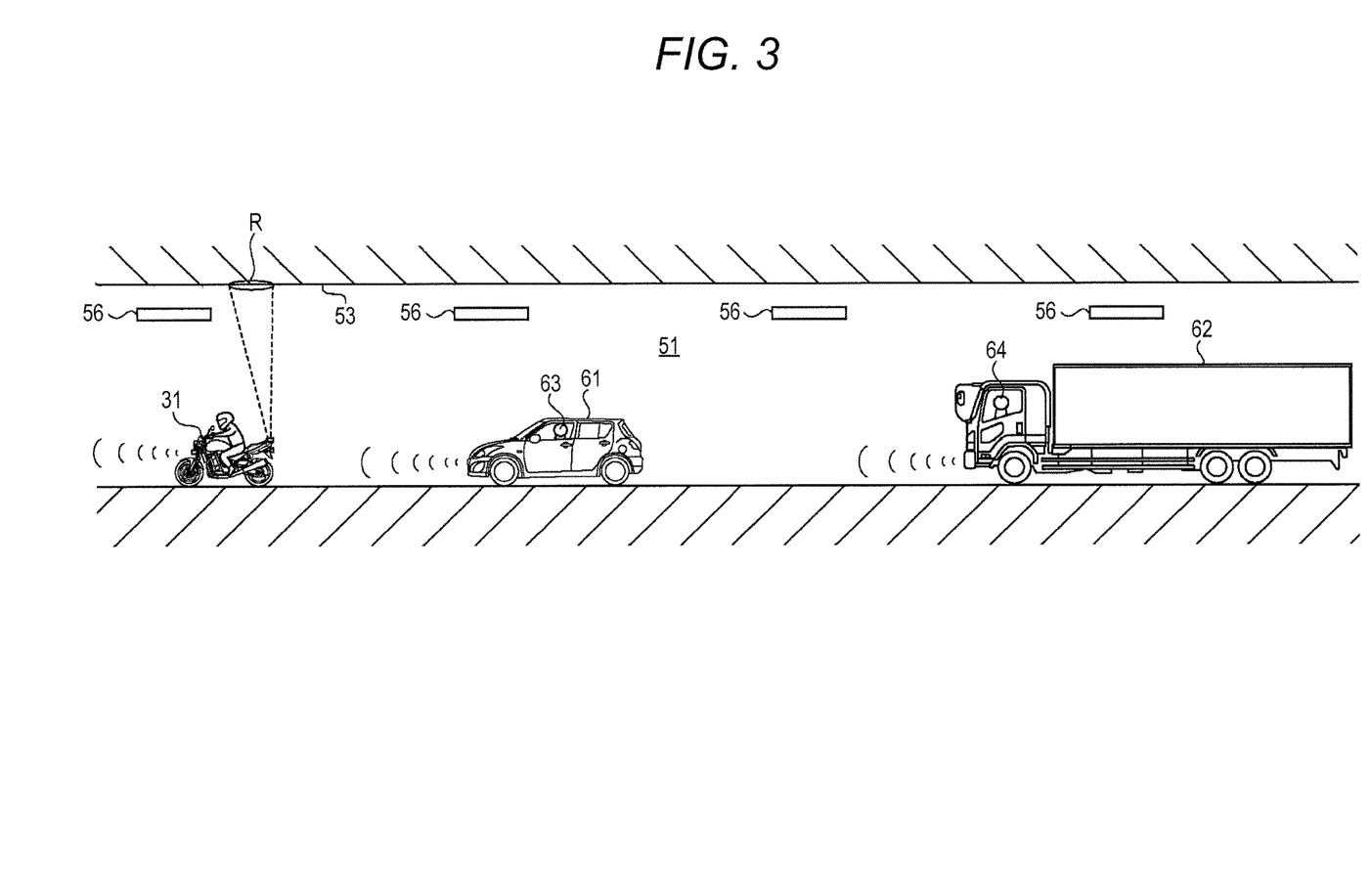
FIG. 3 is an explanatory view in which the vehicles running in the tunnel-like structure are seen from one side.

FIG. 2 is a view in which the subject vehicle 31 running in a tunnel-like structure 51 and other vehicles running behind the subject vehicle (following vehicles) 61 and 62 are seen from behind. FIG. 3 is a view in which the subject vehicle 31 and the following vehicles 61 and 62 running in the tunnel-like structure 51 are seen from one side. In the present embodiment, the tunnel-like structure 51 is a structure having a floor part 52, a ceiling part 53, and a left side wall part 54, and a right side wall part 55, as shown in FIG. 2. On the floor part 52, there is a road such that vehicles can pass through the tunnel-like structure 51. The tunnel-like structure 51 is, for example, a tunnel, an underpass, an escape passage, or the like.

Figure 4:
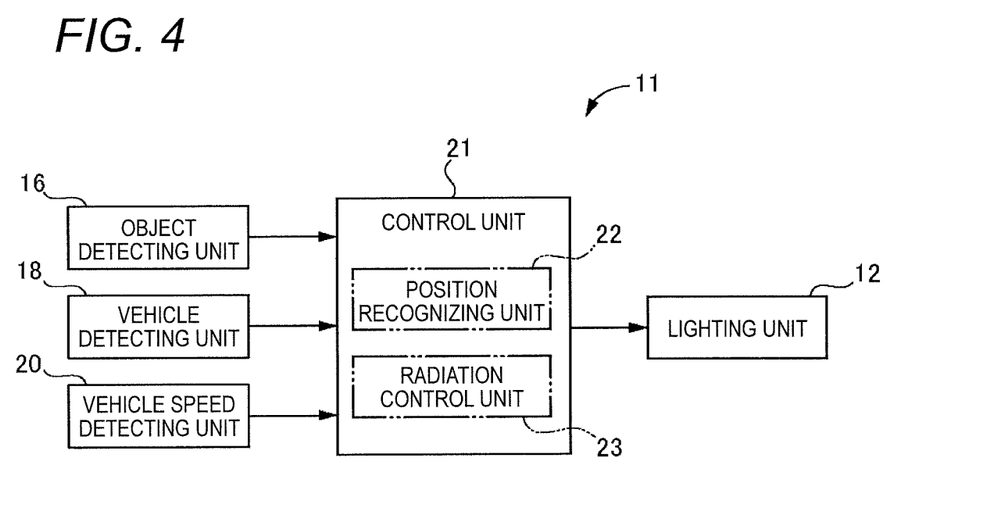
FIG. 4 is a block diagram illustrating the configuration of the position lighting device according to the first embodiment of the present invention.

FIG. 4 shows the configuration of the position lighting device 11. As shown in FIG. 4, the position lighting device 11 includes a lighting unit 12, an object detecting unit 16, a vehicle detecting unit 18, a vehicle speed detecting unit 20, and a control unit 21. The lighting unit 12 is a device for radiating a beam to the ceiling part 53 of the tunnel-like structure 51. As shown in FIG. 1, the lighting unit 12 includes light sources 13. The light sources 13 include, for example, halogen lamps, HID (high intensity discharge lamps), LEDs (light emitting diodes), or the like. Also, the lighting unit 12 includes reflectors 14 for determining the radiation direction and radiation angle of a beam to be radiated from each light source 13.

Also, the lighting unit 12 is configured such that a beam radiated from the lighting unit 12 travels up (straight up) from the subject vehicle 31. The lighting unit 12 is installed on a part of the subject vehicle 31 where there is no object blocking a beam radiated upward from the lighting unit 12. For example, as shown in FIG. 1, the lighting unit 12 is installed on an upper part of the rear part of the motorcycle 31, more specifically, on an upper part of a seat cowl 33. Also, the arrangement of the light sources 13 and the arrangement and shape of the reflectors 14 are set such that a beam radiated from the lighting unit 12 travels up from the subject vehicle 31.

Also, as shown in FIG. 2, the brightness of a beam to be radiated from the lighting unit 12 is set such that when the ceiling part 53 of the tunnel-like structure 51 is irradiated with the beam, people outside the subject vehicle 31, especially, drivers 63 and 64 of the following vehicles 61 and 62 of the subject vehicle 31 can see a reflected beam R of the irradiation beam from the ceiling part 53. Specifically, it is preferable that the lighting unit 12 be basically a lighting device having a spot lighting characteristic. For example, in a case where an average distance from the lighting unit 12 to the ceiling part 53 is 10 m to 20 m, it is preferable to set the radiation angle of a beam to be radiated from the lighting unit 12 to about 18 degrees to 19 degrees, and set the intensity of the beam to 3800 candelas to 15000 candelas (about 300 lumens) or more. However, it is also possible to provide a function of automatically adjusting the intensity of the beam or the radiation angle according to the ambient brightness or the specific distance from the lighting unit 12 to the ceiling part 53.

Also, it is preferable that the color of a beam to be radiated from the lighting unit 12 be a color which is easily seen from the vehicles 61 and 62 behind the subject vehicle 31. In the present embodiment, the beam color is white. However, it is not limited to white, and may be any other color such as red or orange.

The object detecting unit 16 is a device or a device group capable of detecting objects existing at least on the upper side, left side, and right side of the subject vehicle 31. The object detecting unit 16 is, for example, a device capable of detecting objects existing around the subject vehicle 31 using electromagnetic waves or ultrasonic waves, specifically, an ultrasonic sensor, a laser radar, or the like. Also, as the object detecting unit 16, an imaging device or an infrared imaging device for imaging the surroundings of the subject vehicle 31 may be used. Also, the object detecting unit 16 may be a combination of some or all of ultrasonic sensors, laser radars, imaging devices, or/and infrared imaging devices.

The number and arrangement of components constituting the object detecting unit 16 and called ultrasonic sensors, laser radars, imaging devices, or/and infrared imaging devices are set such that it is possible to use the object detecting unit 16 to detect objects existing at least on the upper side, left side, and right side of the subject vehicle 31. For example, as shown in FIG. 1, components constituting the object detecting unit 16 may be intensively installed on the upper part of the front part of the motorcycle 31, more specifically, on the upper side of a handlebar 32. However, a plurality of components constituting the object detecting unit 16 may be distributedly disposed at a plurality of positions of the subject vehicle 31.

Meanwhile, the vehicle detecting unit 18 is a device or a device group for detecting the vehicles 61 and 62 and the like behind the subject vehicle 31. It is preferable that the vehicle detecting unit 18 be configured to detect the following vehicles 61 and 62 and the like by detecting ultrasonic waves or electromagnetic waves emitted from the following vehicles 61 and 62 and the like. This configuration can be implemented by using, for example, a device for receiving ultrasonic waves, lasers, or/and millimeter waves as the vehicle detecting unit 18. Also, this configuration is based on the premise that each of other vehicles such as the vehicles 61 and 62 has a device for detecting objects existing at least on the front side of the corresponding vehicle such as an ultrasonic sensor, a laser radar, or/and a millimeter wave radar as a component of a driving assistance device, an automatic driving device, or the like. Also, as the vehicle detecting unit 18, an imaging device or an infrared imaging device for imaging the area behind the subject vehicle 31 may be used. As shown in FIG. 1, the vehicle detecting unit 18 is installed, for example, on the rear side of the motorcycle 31, specifically, below a taillight 34 or the like. Also, the lighting unit 12 and the vehicle detecting unit 18 may be integrated, for example, by storing them in a single housing.

Meanwhile, the vehicle speed detecting unit 20 is a device for detecting the vehicle speed of the subject vehicle 31, and is, for example, a vehicle speed sensor. The configuration of the vehicle speed detecting unit 20 can use a well-known configuration.

The control unit 21 includes a CPU (a central processing unit) and a storage unit. The control unit 21 may be a dedicated independent unit for the position lighting device 11, or may be a part of an engine control unit for controlling running and the like of the motorcycle 31. The control unit 21 functions as a position recognizing unit 22 and a radiation control unit 23, for example, by reading programs stored in a storage unit and executing them.

The position recognizing unit 22 has a function of recognizing that the subject vehicle 31 is positioned in the tunnel-like structure 51. If the object detecting unit 16 detects the ceiling part 53, the left side wall part 54, and the right side wall part 55 of the tunnel-like structure 51, the position recognizing unit 22 recognizes that the subject vehicle 31 is positioned in the tunnel-like structure 51. For example, the position recognizing unit 22 recognizes that the subject vehicle 31 is positioned in the tunnel-like structure 51, at the moment when the subject vehicle 31 enters the tunnel-like structure 51, and recognizes that the subject vehicle 31 is not positioned in the tunnel-like structure 51, at the moment when the subject vehicle 31 gets out of the tunnel-like structure 51.

The radiation control unit 23 has a function of switching beam radiation from the lighting unit 12 between an ON state and an OFF state by controlling the lighting unit 12.

Figure 5:
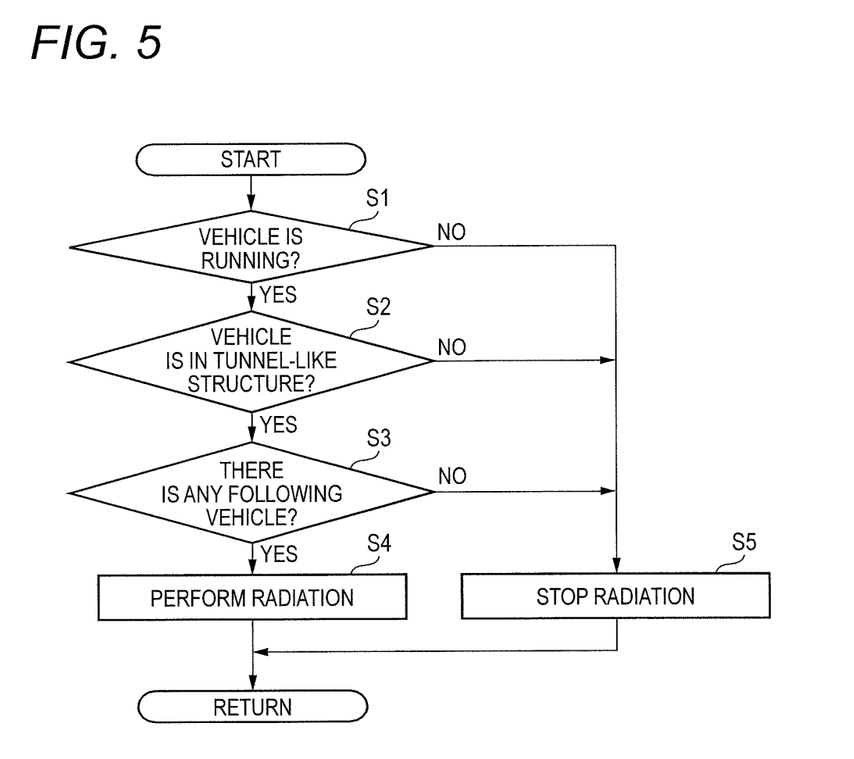
FIG. 5 is a flow chart illustrating a radiation control process of the position lighting device according to the first embodiment of the present invention.

FIG. 5 shows a radiation control process of the position lighting device 11. In the radiation control process of FIG. 5, first, the radiation control unit 23 determines whether the subject vehicle 31 is running or not, on the basis of a detection signal obtained from the vehicle speed detecting unit 20 (STEP S1).

In a case where the subject vehicle 31 is running ("YES" in STEP S1), subsequently, the position recognizing unit 22 determines whether the subject vehicle 31 is positioned in the tunnel-like structure 51 or not (STEP S2).

In a case where the subject vehicle 31 is positioned in the tunnel-like structure 51 ("YES" in STEP S2), subsequently, the radiation control unit 23 determines whether there is at least one vehicle behind the subject vehicle 31 or not, on the basis of a detection signal obtained from the vehicle detecting unit 18 (STEP S3).

In a case where there is at least one vehicle behind the subject vehicle 31 ("YES" in STEP S3), the radiation control unit 23 controls the lighting unit 12 such that the lighting unit radiates a beam (STEP S4).

Meanwhile, in a case where the subject vehicle 31 is not running ("NO" in STEP S1), if the subject vehicle 31 is not positioned in the tunnel-like structure 51 ("NO" in STEP S2) or if there is no vehicle behind the subject vehicle 31 ("NO" in STEP S3), the radiation control unit 23 controls the lighting unit 12 such that the lighting unit stops beam radiation (STEP S5).

In the position lighting device 11 having the above-described configuration, as shown in FIG. 2 or FIG. 3, when the subject vehicle 31 is positioned in the tunnel-like structure 51, a beam is radiated from the lighting unit 12 to the ceiling part 53 of the tunnel-like structure 51. People outside the subject vehicle, in this case, other people such as the drivers 63 and 64 of the vehicles 61 and 62 behind the subject vehicle 31 can see a reflected beam R of the beam radiated from the lighting unit 12 to the ceiling part 53 of the tunnel-like structure 51. Further, on the basis of the reflected beam R, other people such as the drivers 63 and 64 can recognize the position of the motorcycle 31 equipped with the lighting unit 12 which is the radiation source of the corresponding reflected beam R. In other words, according to the position lighting device 11, a beam is radiated from the lighting unit 12 to the ceiling part 53 of the tunnel-like structure 51, such that other people such as the drivers 63 and 64 of the vehicles 61 and 62 behind the subject vehicle 31 can see a reflected beam R of the radiated beam. In this way, it is possible to make other people such as the drivers 63 and 64 recognize the existence or position of the subject vehicle 31. Therefore, it is possible to prevent the subject vehicle 31 from being missed by other people such as the drivers 63 and 64 of the vehicles 61 and 62 behind the subject vehicle 31 in the dark tunnel-like structure 51, and it is possible to prevent the following vehicles 61 and 62 from unreasonably pulling over or unreasonably overtaking the subject vehicle 31.

Also, according to the position lighting device 11, a beam to be radiated from the lighting unit 12 to the ceiling part 53 of the tunnel-like structure 51 is set to be bright and the irradiation range of the beam is set to be large, whereby it is possible to make other people such as the drivers 63 and 64 of the vehicles 61 and 62 behind the subject vehicle 31 easily see a reflected beam R of the radiated beam. Therefore, in a situation in which the subject vehicle 31 is a small vehicle called a motorcycle like in the present embodiment and is in a dark environment, even if it is difficult for other people such as the drivers 63 and 64 of the following vehicles 61 and 62 to directly see the subject vehicle 31, it is possible to make other people such as the drivers 63 and 64 of the following vehicles 61 and 62 easily recognize the existence or position of the subject vehicle 31 on the basis of the reflected beam R.

Also, immediately after the vehicles 61 and 62 and the like behind the subject vehicle 31 enter the dark space in the tunnel-like structure 51, even before eyes of other people such as the drivers 63 and 64 of the following vehicles 61 and 62 become accustomed to the ambient darkness, it is possible to make other people such as the drivers 63 and 64 of the following vehicles 61 and 62 quickly recognize the subject vehicle 31 on the basis of the reflected beam R.

Also, since the reflected beam R from the ceiling part 53 of the tunnel-like structure 51 moves along movement of the subject vehicle 31, it is possible to make other people such as the drivers 63 and 64 of the following vehicles 61 and 62 recognize the speed and behavior such as lane change of the subject vehicle 31.

Also, according to the position lighting device 11, the reflected beam R of the beam radiated from the lighting unit 12 to the ceiling part 53 of the tunnel-like structure 51 spontaneously enters the front vision fields of other people such as the drivers 63 and 64 of the vehicles 61 and 62 behind the subject vehicle 31. Therefore, even if a vehicle behind the subject vehicle 31 is a large vehicle like the following vehicle 62 shown in FIG. 3 and has a driver's seat at a position high from the road, whereby the point of view of the driver 64 of the following vehicle 62 sees a far distance, the driver 64 of the following vehicle 62 can easily recognize the reflected beam R. In other words, even if a vehicle behind the subject vehicle 31 is a large vehicle, it is possible to make the driver of the vehicle behind the subject vehicle 31 easily recognize the existence or position of the subject vehicle 31 on the basis of the reflected beam R.

Also, since the reflected beam R formed by the lighting unit 12 spontaneously enters the front vision fields of other people such as the drivers 63 and 64 of the vehicles 61 and 62 behind the subject vehicle 31, for example, even in a case where the subject vehicle 31 hides behind the following vehicle 61 close to the subject vehicle 31, whereby it is difficult for the driver 64 of the following vehicle 62 far from the subject vehicle 31 to directly see the subject vehicle 31, it is possible to make the driver 64 of the following vehicle 62 easily recognize the existence or position of the subject vehicle 31 on the basis of the reflected beam R.

Also, the position lighting device 11 of the present embodiment is configured to radiate a beam upward from the subject vehicle 31, thereby irradiating the ceiling part 53 of the tunnel-like structure 51. The reflected beam R of the beam radiated to the ceiling part 53 of the tunnel-like structure 51 mainly enters a substantially center area of the field of front vision of the driver 64 of the following vehicle 62 far from the subject vehicle 31. Therefore, it is possible to make the driver 64 of the following vehicle 62 far from the subject vehicle 31 easily recognize the subject vehicle 31. Also, the side wall parts 54 and 55 of the tunnel-like structure 51 have tunnel light fixtures 56 as shown in FIG. 2; whereas the ceiling part 53 has no tunnel light fixtures 56. Therefore, the ceiling part 53 is darker than the side wall parts 54 and 55. Therefore, the reflected beam R is formed on the ceiling part 53, whereby it is possible to make the reflected beam R look relatively bright.

Also, according to the position lighting device 11, the radiation control unit 23 controls the lighting unit 12 such that when the subject vehicle 31 is positioned in the tunnel-like structure 51, a beam is automatically radiated from the lighting unit 12, and when the subject vehicle 31 is not positioned in the tunnel-like structure 51, radiation of the beam from the lighting unit 12 is automatically stopped. Therefore, the driver of the subject vehicle 31 does not need to manually operate the position lighting device 11. Therefore, it is possible to prevent load on a driver of a vehicle from increasing due to addition of the position lighting device to the vehicle.

Also, in a case where the subject vehicle 31 is running, and the subject vehicle 31 is positioned in the tunnel-like structure 51, and there is any other vehicle behind the subject vehicle 31, the position lighting device 11 of the present embodiment radiates a beam. When the subject vehicle 31 is not positioned in the tunnel-like structure 51, the position lighting device stops radiation of the beam, whereby it is possible to prevent unnecessary beam radiation, thereby reducing the amount of power which is consumed by beam radiation. Also, even in a case where the subject vehicle 31 is positioned in the tunnel-like structure 51, if there is no other vehicle behind the subject vehicle 31, beam radiation is stopped, whereby it is possible to reduce beam radiation time, thereby further reducing the power consumption. Also, even if beam radiation is stopped when the subject vehicle 31 is stationary in the tunnel-like structure 51 due to a certain reason such as a traffic jam, it is possible to reduce the power consumption.

Also, according to the position lighting device 11 of the present embodiment, if the object detecting unit 16 detects the ceiling part 53, the left side wall part 54, and the right side wall part 55 of the tunnel-like structure 51, the position lighting device recognizes that the subject vehicle 31 is positioned in the tunnel-like structure 51. Therefore, it is possible to accurately recognize that the subject vehicle 31 is positioned in the tunnel-like structure 51.

[Second Embodiment]

Figure 6:
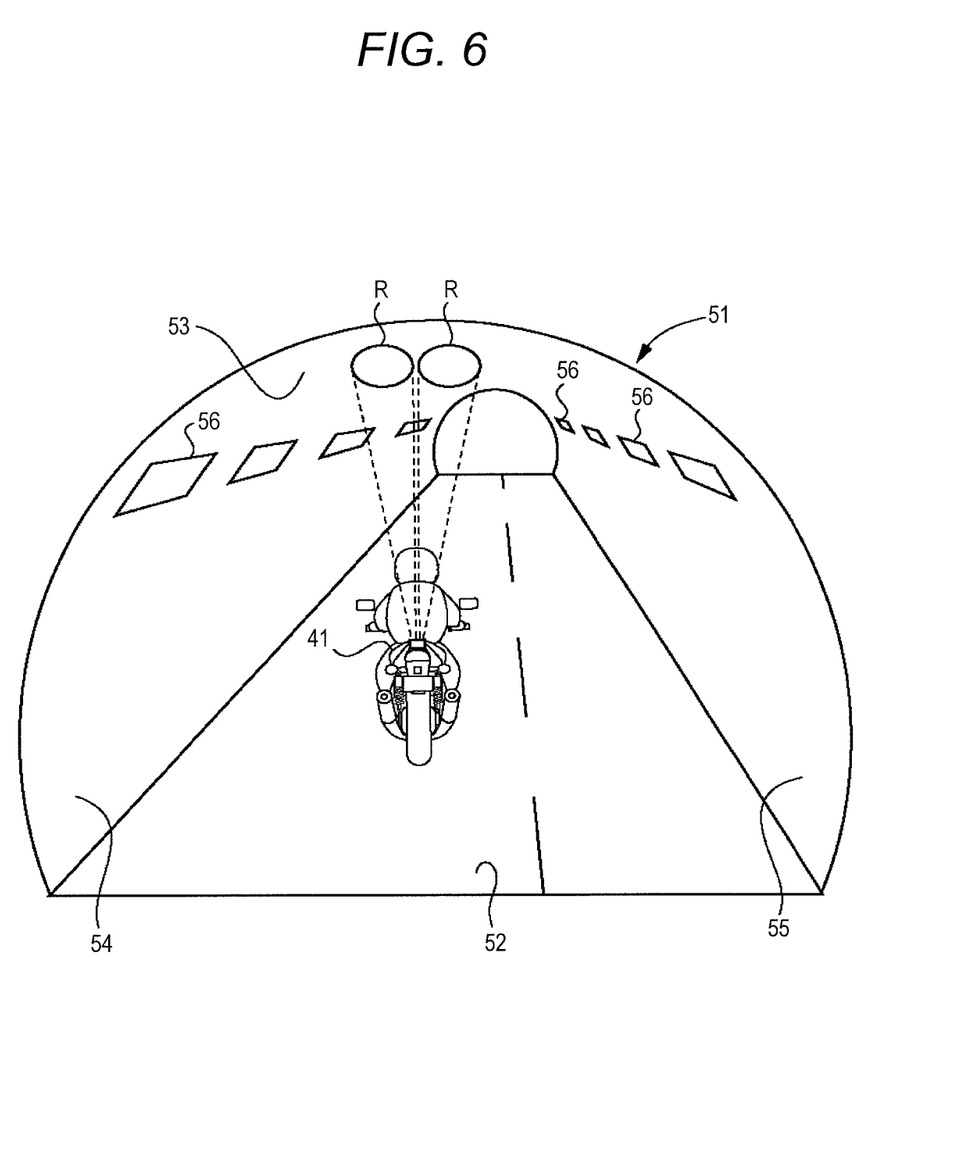
FIG. 6 is an explanatory view of a position lighting device according to a second embodiment of the present invention.

FIG. 6 shows a state where a subject vehicle (a motorcycle) 41 equipped with a position lighting device according to a second embodiment of the present invention is running in a tunnel-like structure 51. One feature of the second embodiment is that the mode of a beam to be radiated from the lighting unit 12 is changed according to the number of vehicles behind the subject vehicle 41. Specifically, as the number of following vehicles increases, the mode of a beam is changed such that the reflected beam R of the beam radiated from the lighting unit 12 becomes more noticeable.

Specifically, as shown in FIG. 6, as the number of following vehicles increases, the number of reflected beams R may be increased. In this case, for example, a plurality of light sources is installed in the lighting unit of the position lighting device and each light source is turned on or off on the basis of the number of following vehicles. Also, in a case where the number of following vehicles is small, a beam may be radiated to the ceiling part 53; whereas in a case where the number of following vehicles is large, a beam may not be radiated to the ceiling part 53. Also, as the number of following vehicles increases, the size of a reflected beam R may be increased. Also, the color and brightness of a beam to be radiated to the ceiling part 53 may be changed depending on whether the number of following vehicles is small or large.

If the mode of a beam to be radiated from the lighting unit 12 is changed according to the number of following vehicles as described above, for example, even in a case where the road in the tunnel-like structure 51 is congested, it is possible to make the drivers of the following vehicles surely recognize the subject vehicle 31.

Also, in the above-described embodiment, the case where a beam from the lighting unit 12 is radiated straight up from the subject vehicle 31 has been taken as an example; however, the beam radiation direction may be inclined forward or backward from the right above. Also, the direction of the beam from the lighting unit 12 may be set to the left such that the left side wall part 54 of the tunnel-like structure 51 is irradiated. Also, for example, in a case where the road in the tunnel-like structure is a single-lane road, the direction of the beam from the lighting unit 12 may be set to the right such that the right side wall part of the tunnel-like structure is irradiated.

Also, in the above-described embodiment, the case where even though the subject vehicle 31 is positioned in the tunnel-like structure 51, if there is no other vehicle behind the subject vehicle 31, beam radiation from the lighting unit 12 is not performed has been taken as an example. However, in a case where the subject vehicle 31 is running in the tunnel-like structure 51, beam radiation from the lighting unit 12 may be always performed. Also, even in a case where the subject vehicle 31 is stationary in the tunnel-like structure 51, beam radiation from the lighting unit 12 may be performed. Also, a manual switch for switching beam radiation from the lighting unit 12 between an ON state and an OFF state may be installed on the motorcycle 31.

Also, in the above-described embodiment, the tunnel-like structure 51 is a structure having the floor part 52, the ceiling part 53, and the left and right side wall parts 54 and 55. However, the tunnel-like structure may be a structure having a floor part, a ceiling part, and one side wall part. In this case, the position recognizing unit 22 may be configured to recognize that the subject vehicle 31 is positioned in the tunnel-like structure, if the object detecting unit 16 detects the ceiling part and any one of the left and right side wall parts.

Also, as the method by which the position recognizing unit 22 recognizes that the subject vehicle 31 is positioned in the tunnel-like structure, a method of measuring the position of the subject vehicle 31 by a GPS (a global positioning system) or the like and matching the position information obtained by position measurement with map data.

Also, the arrangement of the lighting unit 12, the object detecting unit 16, and the vehicle detecting unit 18 shown in FIG. 1 is merely an example. Also, the position lighting device of the present invention is not limited to the naked type motorcycle 31 as shown in FIG. 1, and can be applied to various saddle-ridden type vehicles such as other types of motorcycles, scooters, motor tricycles, and buggy cars, and can also be applied to other types of vehicles such as four-wheel vehicles. Also, the position lighting device of the present invention can be applied to welfare-purpose electric vehicles, golf carts, shopping carts, and so on.

Also, the present invention can be appropriately modified without departing from the gist and idea of the invention which can be read from claims and the entire specification, and position lighting devices and vehicles according to those modifications are also included in the technical idea of the present invention.

What is claimed is:

1. A position lighting device configured to be installed on a vehicle and configured to radiate a beam such that people outside the vehicle can recognize the vehicle, the position lighting device comprising:
   a lighting unit configured to radiate a beam to a ceiling part or a side wall part of a tunnel-like structure which has at least a floor part, the ceiling part, and the side wall part;
   a position recognizing unit configured to recognize that the vehicle is positioned in the tunnel-like structure; and
   a radiation control unit configured to control the lighting unit to radiate the beam if the position recognizing unit recognizes that the vehicle is positioned in the tunnel-like structure,
   wherein the lighting unit is installed on a rear part of the vehicle.

2. The position lighting device according to claim 1, wherein the lighting unit is configured to radiate the beam upward from the vehicle.

3. The position lighting device according to claim 1, wherein the lighting unit is configured to radiate the beam to the ceiling part of the tunnel-like structure such that drivers of other vehicles running behind the vehicle can see a reflected beam of the radiated beam from the ceiling part.

4. The position lighting device according to claim 1, further comprising an object detecting unit configured to detect objects existing at least on the upper side, left side, and right side of the vehicle,
   wherein, when the object detecting unit detects the ceiling part and at least one side wall part of the tunnel-like structure, the position recognizing unit recognizes that the vehicle is positioned in the tunnel-like structure.

5. The position lighting device according to claim 1, further comprising a vehicle detecting unit configured to detect other vehicles running behind the vehicle,
   wherein, when the position recognizing unit recognizes that the vehicle is positioned in the tunnel-like structure, and the vehicle detecting unit detects any other vehicle running behind the vehicle, the radiation control unit controls the lighting unit to radiate the beam.

6. The position lighting device according to claim 1, further comprising a vehicle detecting unit configured to detect other vehicles running behind the vehicle,
   wherein, according to the number of the other vehicles detected by the vehicle detecting unit, the radiation control unit changes a mode of the beam to be radiated from the lighting unit.

7. The position lighting device according to claim 1, wherein the vehicle is a saddle-ridden type vehicle.

8. A vehicle comprising the position lighting device according to claim 1.

9. A position lighting device configured to be installed on a vehicle and configured to radiate a beam such that people outside the vehicle can recognize the vehicle, the position lighting device comprising:
   a lighting unit configured to radiate a beam to a ceiling part directly above the vehicle or a side wall part directly to the side of the vehicle of a tunnel-like structure which has at least a floor part, the ceiling part, and the side wall part;
   a position recognizing unit configured to recognize that the vehicle is positioned in the tunnel-like structure; and
   a radiation control unit configured to control the lighting unit to radiate the beam if the position recognizing unit recognizes that the vehicle is positioned in the tunnel-like structure.

* * * * *